(12) United States Patent
Tiziano

(10) Patent No.: US 6,409,254 B2
(45) Date of Patent: Jun. 25, 2002

(54) CAB FRAME FOR AN AGRICULTURAL MACHINE

(75) Inventor: Salvini Tiziano, Treviglio (IT)

(73) Assignee: Same-Deutz-Fahr SpA (IT)

( * ) Notice: Subject to any disclaimer, the term of this patent is extended or adjusted under 35 U.S.C. 154(b) by 0 days.

(21) Appl. No.: 09/753,631

(22) Filed: Jan. 3, 2001

(30) Foreign Application Priority Data

Jul. 28, 2000 (EP) ................................................. 830538

(51) Int. Cl.$^7$ ............................................... B60R 27/00
(52) U.S. Cl. ............. 296/190.08; 296/205; 296/190.03; 296/201
(58) Field of Search ............................ 296/190.08, 205, 296/190.03, 201

(56) References Cited

U.S. PATENT DOCUMENTS

| 4,079,985 A | | 3/1978 | Martin |
|---|---|---|---|
| 4,135,756 A | * | 1/1979 | Hausmann ............. 296/190.03 |
| 4,605,259 A | * | 8/1986 | Hurlburt ...................... 296/190 |
| 4,772,065 A | * | 9/1988 | Nakata et al. ............... 296/201 |
| 5,096,254 A | * | 3/1992 | Sparke ........................ 296/205 |
| 5,269,585 A | * | 12/1993 | Klages et al. ................ 296/205 |
| 5,273,340 A | * | 12/1993 | Nelson et al. ............... 296/190 |
| 5,280,955 A | * | 1/1994 | Nelson et al. ............... 296/189 |
| 5,577,796 A | | 11/1996 | Clausen |
| 5,794,398 A | * | 8/1998 | Kaehler et al. .............. 296/205 |
| 5,810,428 A | * | 9/1998 | Maki ........................... 296/205 |
| 6,102,472 A | * | 8/2000 | Wallstrom ................... 296/205 |
| 6,116,680 A | * | 9/2000 | Hunter et al. ............... 296/205 |
| 6,241,310 B1 | * | 6/2001 | Patelczyk .................... 296/205 |
| 6,244,369 B1 | * | 6/2001 | Yunoue et al. .......... 296/190.08 |
| 6,282,790 B1 | * | 9/2001 | Jackel et al. ................. 296/205 |
| 6,325,449 B1 | * | 12/2001 | Sorensen et al. ....... 296/190.08 |

FOREIGN PATENT DOCUMENTS

| DE | 19548997 C1 | 12/1995 |
|---|---|---|
| GB | 1559178 | 1/1980 |

* cited by examiner

Primary Examiner—Joseph D. Pape
Assistant Examiner—Hilary Gutman
(74) Attorney, Agent, or Firm—TraskBritt

(57) ABSTRACT

A frame of a cab for an agricultural machine includes a series of uprights (18), which carry its upper end a structure for supporting a roof (16). The frame includes a first series of sectional elements (18), with cross sections equal to one another, which forms the uprights (18). A second series of sectional elements (32), with cross sections equal to one another, forms the roof-supporting structure (16).

7 Claims, 2 Drawing Sheets

CAB FRAME FOR AN AGRICULTURAL MACHINE

BACKGROUND OF THE INVENTION

1. Field

The present invention relates to a frame of a cab for an agricultural machine, in particular for a tractor, comprising a series of uprights carrying at their tops a structure for supporting the roof.

2. State of the Art

Cab frames for agricultural machines are generally made up of a plurality of metal tubular sectional elements welded together. The tubular sectional elements which form the uprights and the roof-supporting structure must possess characteristics of structural resistance adequate for the mass of the agricultural machine and must be able to resist a crushing force equal to twice the weight of the agricultural machine. At the same time, it is desirable that the metal tubular sectional elements making up the uprights should enable the glazed surfaces of the cab to be set as close to one another as possible in order to increase visibility and to obtain a better result from the aesthetic point of view. The tubular sectional elements making up the roof-supporting structure must moreover have a very limited height in order not to reduce visibility or reduce the opening for access through the doors. In addition, the tubular sectional elements making up the uprights and the roof-supporting structure must be provided with resting surfaces for the weather-stripping of the doors, windscreen and the rear window. The resting surfaces must have an optimized inclination according to the position of the sectional element so as to guarantee a condition of optimal seal with the corresponding weather-stripping.

In known solutions, to meet the above requirements, frequently tubular sectional elements are used having different cross sections according to their position. This solution is costly from the standpoint of the production process in that it involves managing tubular sectional elements of varying cross section.

BRIEF SUMMARY OF THE INVENTION

The aim of the present invention is to provide a frame of a cab for an agricultural machine that makes it possible to overcome the above-mentioned problems.

A frame for a cab for an agricultural machine includes a plurality of uprights which carry at their upper region a structure for supporting the roof. The plurality of uprights is formed of a first series of sectional elements having cross sections which are equal to one another. The structure for supporting the roof is formed by a second series of sectional elements having cross sections which are equal to one another.

In one embodiment of the invention, each of the sectional elements of the first series has a cross-section formed of two parallel rectilinear sides, an arched portion and two inclined sides having outer surfaces for resting weather-stripping.

In a second embodiment, each of the sectional elements of the second series has a trapezoidal cross section with a pair of rectilinear sides oriented parallel to one another and a pair of inclined sides.

BRIEF DESCRIPTION OF THE SEVERAL VIEWS OF THE DRAWINGS

The present invention will now be described in detail with reference to the attached drawings, which are provided purely to furnish a non-limiting example, and in which.

DETAILED DESCRIPTION OF THE INVENTION

Figure 1:
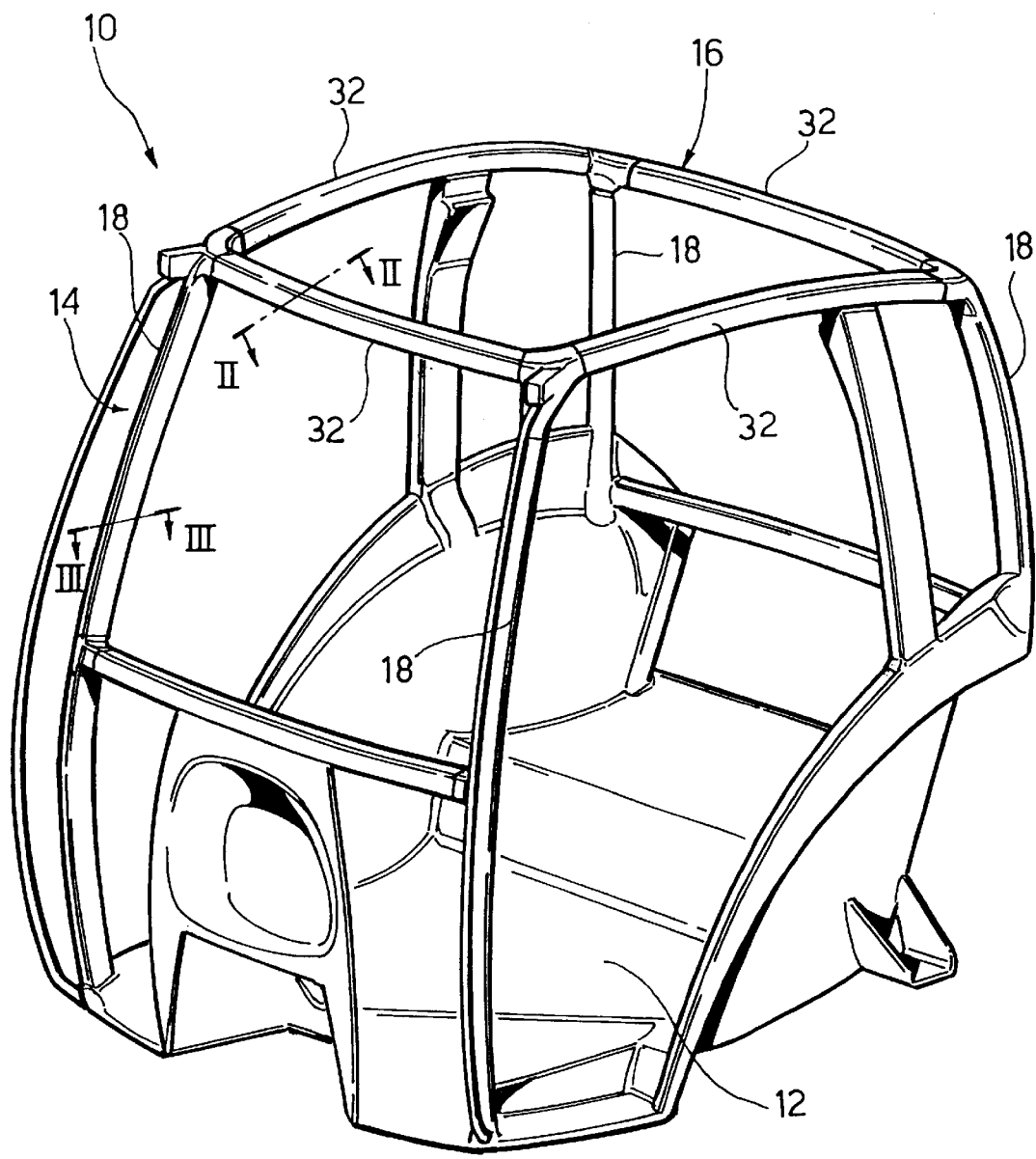
FIG. 1 is a perspective view of a frame of a cab for tractors according to the present invention.
Figure 3:
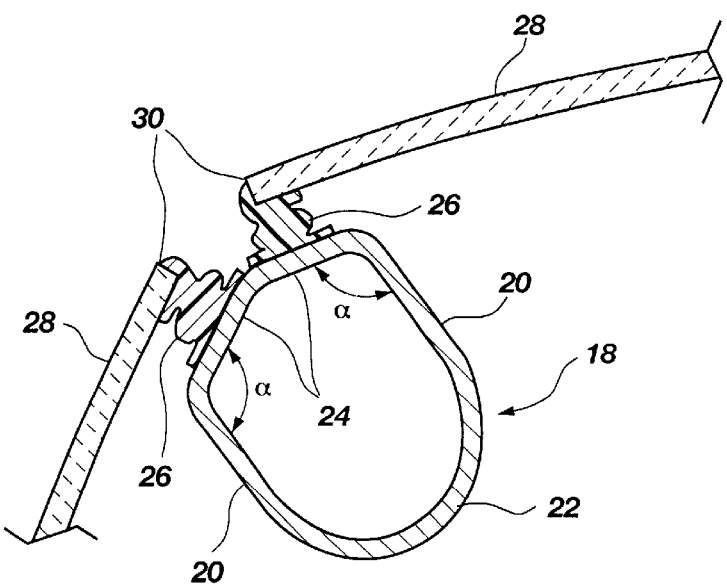

With reference to FIG. 1, the number 10 designates a frame of a cab for a tractor. The frame 10 has substantially the shape of a cage and comprises a platform 12 made of stamped plate, a lateral supporting structure 14, and a roof-supporting structure 16. The lateral supporting structure 14 comprises four uprights 18 consisting of metal tubular sectional elements and fixed, at their bottom ends, to the platform 12 and, at their top ends, to the roof-supporting structure 16. The four sectional elements forming the uprights 18 have all the same cross section. As illustrated in FIG. 3, each sectional element 18 has two parallel rectilinear sides 20, an arched portion 22 facing towards the inside of the frantic, and two inclined sides 24 facing towards the outside of the frame. The two sides 24 are inclined at an angle α with respect to the parallel sides 20, and the said angle at is between 100° and 120°, and preferably in the region of 110°. The outer surfaces of the inclined sides 24 constitute striking surfaces for weather-stripping 26 for openable windows 28, or else constitute gluing surfaces for fixed windows. The two parallel sides 20 are used for fixing striker plates for handles and locks, whilst the arched portion 22 has aesthetic and accident-prevention functions, since it faces towards the inside of the cab. The two inclined sides 24 with an inclination of 110° with respect to the parallel sides 20 enable the edges 30 of the windows 28 to be brought close together, thus giving the impression of a cab with flush glazed surfaces. The angle of 110° is ideal for rendering the striking side of the weather-stripping always perpendicular to the weather-stripping itself and enables the weather-stripping to be hidden within the dimensions of the metal sectional elements, „; so reducing the blind angle of visibility to values just above 3° for a tractor having a weight of 6000 kg. The cross section illustrated in FIG. 3 makes it possible to reduce the blind angle of visibility with respect to traditional solutions and, at the same time, enables an increase in the resting surface available for the weather-stripping, so allowing better adjustment of the position of the windows. The angle c has been obtained by calculating a mean of the optimal angles for all the resting surfaces of the windows and by selecting a value that can provide resting conditions close to the optimal conditions for all the glazed surfaces of the cab. In this way, it is possible to use sectional elements having the same cross section for all the uprights provided with a resting surface for the weather-stripping of a glass window.

The roof-supporting structure 16 consists of four tubular sectional elements, all of which have the same cross section, two being set longitudinally along the sides of the frame 10, and the remaining two forming a front cross member and a rear cross member.

Figure 2:
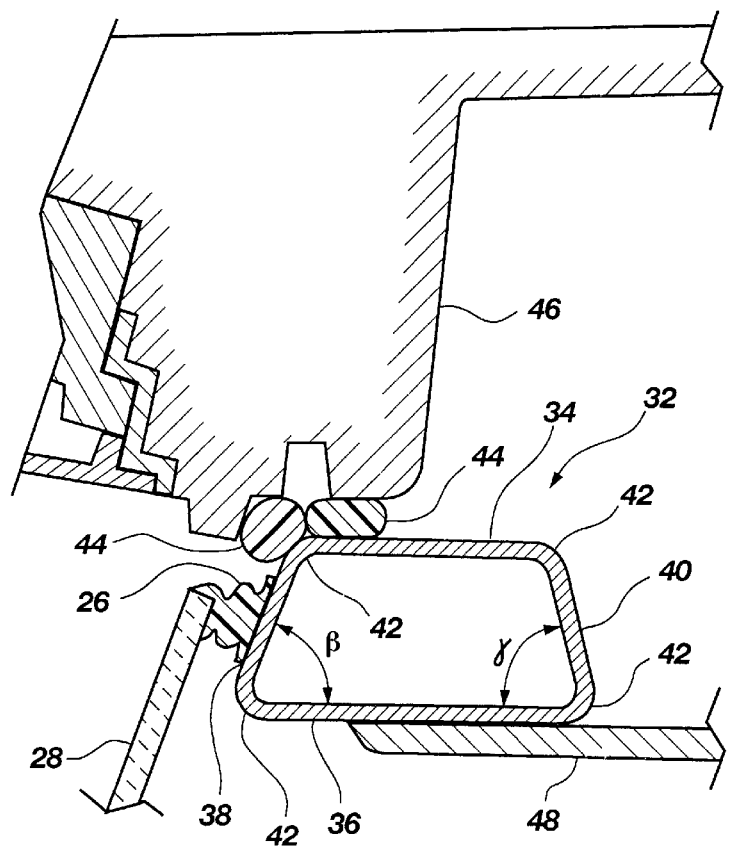
FIGS. 2 and 3 are sections according to the lines II—II and III—III of FIG. 1.

As is illustrated in FIG. 2, each tubular sectional element 32 has a trapezoidal form and presents a top rectilinear side 34, a bottom rectilinear side 36, and two inclined sides 38, 40. Connecting radiuses 42 are provided between each pair of adjacent sides. The smaller side 34 of the trapezoidal sectional element faces upwards and is used for resting a weather-strip 44 for sealing the roof 46 or for possible gluing of the roof. The larger side 36 of the trapezoidal sectional element is used for fixing the roof-panel upholstery 48. The two inclined sides 38, 40 have different angles of inclination with respect to the bottom side 36, the angles being designated, respectively, by β and α. Preferably, the angle β is in the region of 70°, and the angle y is in the region of 77°. The side 38 with an inclination of 70° is used as a resting surface for the weather-stripping of the windscreen, the doors and the side windows. This side is also used for gluing in place a fixed windscreen. The side 40, inclined at 77°, is used as a resting surface for the weather-stripping of the rear hatch. In this way, it is possible to use sectional elements having the same cross section to make the roof-supporting structure 16, so achieving optimal resting conditions for the weather-stripping of the glazed surfaces. In particular, the inclinations of 70° and 77° make it possible to obtain a resting, surface that is always parallel to the edge of the glass carrying the weather-stripping, thus ensuring proper operation of the weather-stripping.

The sectional elements 18 and 32 forming the uprights and the roof-supporting structure make it possible to obtain structural elements having an inertial mass adequate for the mass of the tractor and sufficient for passing crushing tests with a weight equal to twice the weight of the tractor. The sectional elements 32 of the roofs-supporting structure moreover have a very limited height, which does not reduce either visibility or the opening for access through the doors.

What is claimed is:

1. A frame for a cab for an agricultural machine, said frame comprising:

a plurality of uprights, said uprights being formed of a first series of sectional elements with cross-sections equal to one another; and a structure for supporting a roof, said structure being formed of a second series of sectional elements with cross sections equal to one another, said structure being positioned on top of said plurality of uprights;

wherein said sectional elements of said first series of sectional elements have a cross section having two parallel rectilinear sides, an arched portion, and two inclined sides having outer surfaces for resting weather-stripping.

2. The frame according to claim 1, wherein the inclined sides have an inclination with respect to the aforesaid parallel sides of between 100° and 120°.

3. The frame according to claim 2, wherein the inclination is roughly 110°.

4. A frame for a cab for an agricultural machine, said frame comprising:

a plurality of uprights, said uprights being formed of a first series of sectional elements with cross-sections equal to one another; and a structure for supporting a roof, said structure being formed of a second series of sectional elements with cross sections equal to one another, said structure being positioned on top of said plurality of up rights;

wherein the sectional elements of the second series of sectional elements have a trapezoidal cross section with a pair of rectilinear sides parallel to one another and a pair of inclined sides.

5. The frame according to claim 4, wherein the inclined sides have different inclinations with respect to the parallel sides.

6. The frame according to claim 5, wherein one of the inclined sides has an inclination with respect to a larger side of the trapezoidal section of roughly 70°.

7. A frame according to claim 5, wherein one of the inclined sides has an inclination with respect to a larger side of the trapezoidal section of roughly 77°.

* * * * *